Dec. 26, 1950  J. DOLEJS  2,535,907
FISHING BOBBER
Filed Dec. 8, 1945

INVENTOR
JOSEPH DOLEJS
BY Wheeler, Wheeler & Wheeler
ATTORNEYS

Patented Dec. 26, 1950

2,535,907

UNITED STATES PATENT OFFICE 2,535,907

FISHING BOBBER

Joseph Dolejs, Antigo, Wis.

Application December 8, 1945, Serial No. 633,600

3 Claims. (Cl. 43—44.92)

This invention relates to improvements in fishing bobbers.

It is a primary object of the invention to provide a novel and improved fishing bobber or float for a fishing line which may be readily adjusted as desired along the line, and will maintain its position at the point to which it is adjusted, and will, nevertheless, cause no injury to the line either in the course of adjustment or in the course of attachment to or removal from the line.

More specifically, it is my purpose to provide a fishing bobber of balanced weight distribution which requires no moving parts and may nevertheless be attached, removed, and adjusted with respect to the line with unusual facility and without the necessity of pulling any plugs, or forming any loops or hitches in the line.

Figure 1:
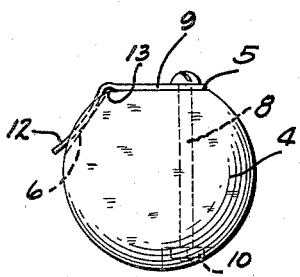
Figure 2:
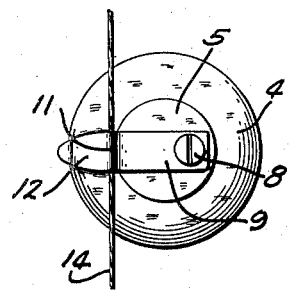
Figure 3:
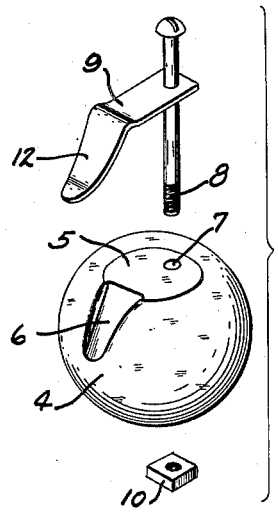

It is a further object of the invention to provide a fishing bobber about which the line cannot tangle, snarl, or kink. In the drawings, Fig. 1 is a view of my improved device of side elevation. Fig. 2 is a plan view of my device. Fig. 3 is a view in perspective of the component parts as they appear when separated.

The float 4 is of generally spherical form but has a flattened face at 5 and a slight recess at 6 leading from its face 5 to a point on its periphery spaced from such face. Offset at the opposite side of the float from the recess 6, there is a bolt hole 7 through which extends the bolt 8 for clamping the plate 9 to the flat face 5 of the float. The nut 10 on the bolt is preferably socketed in the portion of the float opposite the flat face 5.

The plate 9 extends across the flat face 5 toward the recess 6 and is provided at 11 with a bend which is relatively sharp as shown in Fig. 1 and is so located as to be substantially clear of the surface of the float. From this bend a tapered and slightly concave arm 12 extends downwardly through the recess 6 and projects slightly from the float at its tip. In the angle between the arm 12, the plate 9, and the float 4 there is a crevice 13 which is slightly smaller in cross section than the fishing line 14.

The line may readily be manipulated into and from the crevice 13. A length of the line, at any desired point thereon, may be pulled beneath the projecting tip of the arm 12. The curvature of such arm will enable the line to be forced beneath the arm with a camming action which will displace the arm due to the resilience of the material of which the arm 12 and the float 4 are made. When the line reaches the crevice 13, the resilience of the plate 9, and also the resilience of the float 4, which is preferably made of cork or the like, will frictionally hold the line so that the float will be maintained in engagement with the selected portion of the line. If a different adjustment of the float along the line is desired, the line can readily be pulled through the crevice 13 or the float may be slid along the line to a new position, as the case may be. Whatever position of adjustment is selected, the frictional engagement between the parts will maintain such adjustment.

When it is desired to remove the float from the line, the line is again manipulated beneath the arm 12, thereby effecting its complete release. It will be observed that it is not necessary to employ any movable attaching devices or to form any loops in the line. The circular form of the float and the balance achieved by the fact that the bolt 8 is offset from the axis of the float, at the opposite side thereof from the arm 12, together with the absence of any projecting parts, assures that there will be no tangling of the line with the float in use of the apparatus.

I claim:

1. A fishing bobber comprising a combination with a float having a convex surface and a flattened face, said float having a bore opening therethrough substantially at right angles to said face and offset to one side of the vertical axis thereof, said float further having a surface recess at the opposite side of said axis, of a clip comprising a plate applied to said face and provided with an angularly disposed concave arm extending across said recess and having a tipped portion slightly projecting from said float, together with bolt means passing through said bore and said plate and securing said clip means to said float, said recess being located in a portion of the surface of the float above the central plane thereof so that the weight of the bolt will counterbalance the arm structure so as to maintain the flat surface of the float substantially horizontal.

2. A fishing bobber comprising a generally spherical cork float having a flattened face on a minor chord, said float having therethrough a bore opening at right angles to said flattened face and at one side of the axis perpendicular to said flattened face, and a surface recess opening to the opposite side of said axis, in combination with a clip comprising a plate applied to said face, a bolt passing through the plate and through said bore, and an arm angularly joined to said plate at a point remote from the bolt and disposed in the recess, said arm having a tip projecting from the surface of the float, and the angular juncture between the plate and the arm being disposed to receive a line, the arm being counterbalanced by said bolt so as to maintain the plate level when in use.

3. A fishing bobber comprising a float having an end face, a screwthreaded fastener entering the float at a side of the face offset from the vertical axis of said float, said float having a beveled recess opening to said face at the opposite side thereof from said fastener, and a spring clip comprising a plate having an aperture through which said fastener is disposed to hold said plate to said float, said plate extending from the fastener across said face and provided with an oblique arm angularly joined to the plate and extending through said beveled recess and provided with a tip projecting from the surface of and at the side of the float, the angular juncture between the plate and the arm providing a groove to receive a line manipulated through said recess between said arm and said float, the arm being counterbalanced by said fastener so as to maintain the plate level when in use.

JOSEPH DOLEJS.

REFERENCES CITED

The following references are of record in the file of this patent:

UNITED STATES PATENTS

| Number | Name | Date |
| --- | --- | --- |
| 726,118 | Tomic | Apr. 21, 1903 |
| 1,371,188 | Wells, Sr. | Mar. 8, 1921 |
| 1,575,216 | Kuehn et al. | Mar. 2, 1926 |
| 2,391,167 | Kelly | Dec. 18, 1945 |
| 2,406,252 | Potter | Aug. 20, 1946 |